(12) United States Patent
Takeshima et al.

(10) Patent No.: US 7,900,157 B2
(45) Date of Patent: Mar. 1, 2011

(54) SCROLL POSITION ESTIMATION APPARATUS AND METHOD

(75) Inventors: Hidenori Takeshima, Ebina (JP); Takashi Ida, Kawasaki (JP); Toshimitsu Kaneko, Kawasaki (JP); Nobuyuki Matsumoto, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 811 days.

(21) Appl. No.: 11/869,849

(22) Filed: Oct. 10, 2007

(65) Prior Publication Data

US 2008/0092078 A1    Apr. 17, 2008

(30) Foreign Application Priority Data

Oct. 13, 2006   (JP) .............................. 2006-280414

(51) Int. Cl.
*G06F 3/048* (2006.01)
(52) U.S. Cl. ...................... 715/786; 715/781; 715/784; 715/785
(58) Field of Classification Search ................. 715/781, 715/784, 785, 786; 345/684; 707/E17.107, 707/E17.121, E17.119
See application file for complete search history.

(56) References Cited

U.S. PATENT DOCUMENTS

| 6,157,381 | A   | * | 12/2000 | Bates et al. ................. 715/786 |
| 7,496,855 | B2  | * | 2/2009  | Guido et al. ................. 715/784 |
| 2002/0051572 | A1 |   | 5/2002  | Matsumoto et al. ......... 382/190 |
| 2005/0251499 | A1 | * | 11/2005 | Huang ............................ 707/1 |
| 2006/0047643 | A1 | * | 3/2006  | Chaman ........................ 707/3 |
| 2006/0224577 | A1 | * | 10/2006 | Hullender et al. .............. 707/5 |
| 2006/0259585 | A1 | * | 11/2006 | Keohane et al. ............. 709/219 |
| 2007/0046785 | A1 |   | 3/2007  | Matsumoto et al. ...... 348/222.1 |
| 2007/0139727 | A1 |   | 6/2007  | Booppanon et al. ......... 358/474 |

FOREIGN PATENT DOCUMENTS

JP        2002-222165 A        8/2002

(Continued)

OTHER PUBLICATIONS

Search Report from corresponding JP Patent Appln No. 2006-280414 dated Nov. 11, 2008.
U.S. Appl. No. 11/953,370, filed Dec. 10, 2007, Takashi Ida.
U.S. Appl. No. 12/026,674, filed Feb. 6, 2007, Nobuyuki Matsumoto.

(Continued)

*Primary Examiner*—Tadeese Hailu
*Assistant Examiner*—Haoshian Shih
(74) *Attorney, Agent, or Firm*—Ohlandt, Greeley, Ruggiero & Perle, L.L.P.

(57) ABSTRACT

A scroll position estimation apparatus includes a unit acquiring a complex document including main data and sub-data items, the main data being for determining a layout of presentation of the complex document, a unit visualizing the main data, a unit presenting the visualized main data, a unit acquiring scroll positions indicating display areas of the presented main data, a unit storing pairs of the scroll positions and times of acquiring the scroll positions, a unit estimating a future scroll position based on the scroll positions and the times, a unit computing priority levels of the sub-data items based on the estimated scroll position, the priority levels being used to determine order of visualization, a unit sequentially visualizing the sub-data items in accordance with the computed priority levels of the sub-data items, and a unit presenting the visualized sub-data items.

12 Claims, 7 Drawing Sheets

FOREIGN PATENT DOCUMENTS

| | | |
|---|---|---|
| JP | 2003-18398 | 1/2003 |
| JP | 3369520 | 1/2003 |
| JP | 3583924 | 11/2004 |
| JP | 2005-056303 A | 3/2005 |
| JP | 2005-156626 A | 6/2005 |
| JP | 2005-322046 A | 11/2005 |

OTHER PUBLICATIONS

Nakano, et al., "A Page Transmission Mechanism with Transmission Order Control of Inline Objects", Inst. Electronics, Information and Communication Engineers, Trans D-I vol. J84-D-I No. 2, pp. 155-164, 2001.

U.S. Appl. No. 11/558,219, filed Nov. 9, 2006.

U.S. Appl. No. 11/828,397, filed Oct. 2, 2007, Hidenori Takeshima, et al.

\* cited by examiner

```
<center>
<img src="image1.jpg" width="800" height="600" alt="image1">
Text 1···
<img src="image2.jpg" width="800" height="600" alt="image2">
Text 2···
<img src="image3.jpg" width="800" height="600" alt="image3">
Text 3···
</center>
```

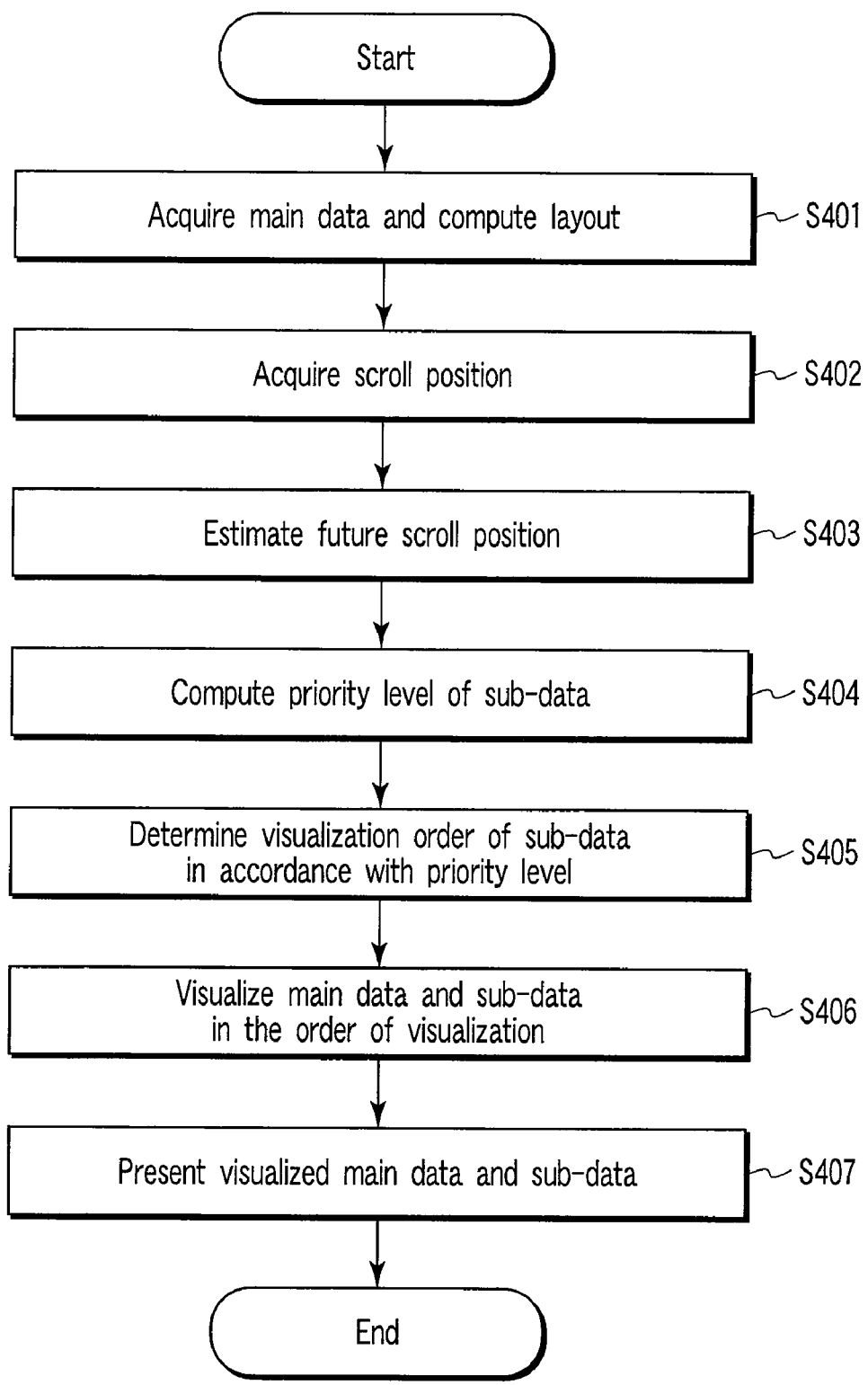
F I G. 4

SCROLL POSITION ESTIMATION APPARATUS AND METHOD

CROSS-REFERENCE TO RELATED APPLICATIONS

This application is based upon and claims the benefit of priority from prior Japanese Patent Application No. 2006-280414, filed Oct. 13, 2006, the entire contents of which are incorporated herein by reference.

BACKGROUND OF THE INVENTION

1. Field of the Invention

The present invention relates to a scroll position estimation apparatus and method used for the process of visualizing each sub-data item when a complex document, such as a web page embedded with a plurality of images, formed of main data and sub-data items is input.

2. Description of the Related Art

When visualizing (presenting) a complex document formed of main data and sub data (for example, Hypertext Markup Language [HTML] data and images embedded therein), the time required for visualizing the main data may significantly differ from that required for visualizing the sub-data. For instance, download time is regarded as a time required for visualization. A Web browser for visualizing HTML data requests downloading embedded images in the order of HTML analysis, and visualizes the images in the order of arrival. At this time, the order of presenting embedded images is not always identical to that of presentation desired by a Web page designer or user.

In light of the above, there has been proposed a method for presenting images in the order desired by a Web page designer, in which the order of downloading sub-data is designated to visualize the sub-data in the order desired by the Web page designer of HTML data (see, for example, Institute of Electronics, Information and Communication Engineers Article D-I vol. J84-D-I No. 2, pp. 155-164, 2001, "A Page Transmission Mechanism with Transmission Order Control of Inline Objects," written by Nakano, et al.).

In the prior art, although Web page designers can control the order of visualization of sub-data, they cannot change the order of visualization in accordance with a change in user-side environment caused by, for example, a scroll operation. More specifically, there may be a case where sub-data to be skipped by a screen scroll operation is preferentially visualized, compared to sub-data to be selected by the scroll operation.

Further, when an image or Web page is displayed on a small screen such as the screen of a cellular phone or PDA, scrolling is often utilized. In the prior art, an interface is provided in which whenever a user operates a button, the scroll position of the screen is updated, thereby updating the display area. In this case, the user must operate the button whenever they need scrolling.

BRIEF SUMMARY OF THE INVENTION

In accordance with a first aspect of the invention, there is provided a scroll position estimation apparatus comprising: a first acquisition unit configured to acquire a complex document including main data and a plurality of sub-data items, the main data being for determining a layout of presentation of the complex document; a first visualization unit configured to visualize the main data; a first presentation unit configured to present the visualized main data; a second acquisition unit configured to acquire a plurality of scroll positions indicating display areas of the presented main data; a position-time storage unit configured to store pairs of the scroll positions and a plurality of times of acquiring the scroll positions; a first estimation unit configured to estimate a future scroll position based on the scroll positions and the times; a priority computation unit configured to compute a plurality of priority levels of the sub-data items based on the estimated scroll position, the priority levels being used to determine order of visualization; a second visualization unit configured to sequentially visualize the sub-data items in accordance with the computed priority levels of the sub-data items; and a second presentation unit configured to present the visualized sub-data items.

In accordance with a second aspect of the invention, there is provided a scroll position estimation apparatus comprising: a first change unit configured to change a scroll position indicating a display area in a document; a detection unit configured to detect whether the scroll position is changed; a storage unit configured to store a scroll operation performed to change the scroll position, and a time at which the scroll operation is performed, when it is detected that the scroll position is changed; a second change unit configured to change the scroll position in accordance with the scroll operation; an estimation unit configured to estimate a future scroll position based on the stored scroll operation and the stored time, when it is detected that the scroll position is not changed; and a third change unit configured to change the scroll position to the estimated scroll position.

In accordance with a third aspect of the invention, there is provided a scroll position estimation apparatus comprising: a first change unit configured to change a scroll position indicating a display area in a document; a detection unit configured to detect whether the scroll position is changed; a first storage unit configured to store a scroll operation performed to change the scroll position, and a time at which the scroll operation is performed, when it is detected that the scroll position is changed; a second storage unit configured to store number of occasions in which the scroll operation is performed; an increasing unit configured to increase the stored number whenever the scroll operation is performed; an initialization unit configured to initialize the stored number when a time elapsing after the scroll operation is performed lastly exceeds a first threshold value; a second change unit configured to change the scroll position in accordance with the scroll operation; an estimation unit configured to estimate a future scroll position based on the stored scroll operation and the stored time, when it is detected that the scroll position is not changed, and when the stored number exceeds a second threshold value; and a third change unit configured to change the scroll position to the estimated scroll position.

BRIEF DESCRIPTION OF THE SEVERAL VIEWS OF THE DRAWING

FIG. 4 is a flowchart useful in explaining an operation example of the scroll position estimation apparatus of FIG. 1;

DETAILED DESCRIPTION OF THE INVENTION

Figure 1:
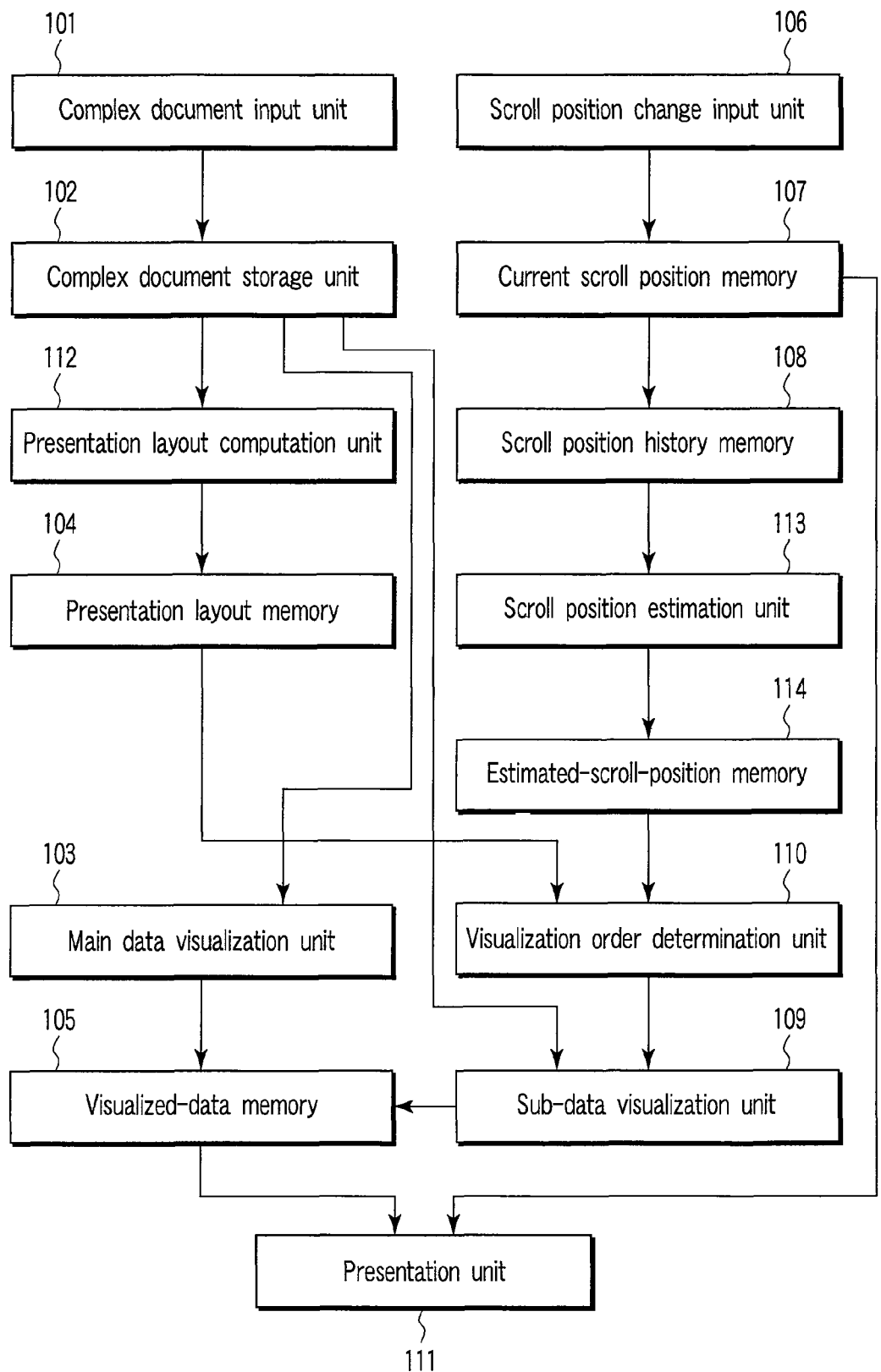
FIG. 1 is a block diagram illustrating a scroll position estimation apparatus according to an embodiment.

A detailed description will be given of a scroll position estimation apparatus and method according to an embodiment, referring to the accompanying drawings.

The embodiment is devised to determine the order of visualization of a complex document when a presentation device cannot simultaneously present all visualized document data, and hence scroll processing is performed to change to-be-presented portions of the data in accordance with a user's instruction. For instance, there is a case where when a complex document formed of main data, such as a text with tags, and sub-data is visualized and presented to a user, a higher priority may be imparted to visualization of sub-data that is currently displayed but will soon fall out of the display area as a result of a scroll operation, than to sub-data that will be soon selected by the scroll operation. In this case, much time is required to visualize sub-data and present it to a user.

The basic idea of the embodiment lies in that when visualizing a complex document, firstly, the overall layout of the to-be-visualized document is determined based on the main data contained in the document, then the time for providing a user with each sub-data item contained in the document (i.e., the time for which the user views each sub-data item) is estimated, and lastly, a higher priority is imparted to visualization of the sub-data item whose estimated time is longer.

The scroll position estimation apparatus and method of the embodiment can appropriately provide a user with data necessary for them.

The terms used in the embodiment will now be explained.

A complex document is a combination of a plurality of types of data, such as a combination of an HTML and image embedded therein. For facilitating the description, both actual embedding (each item is actually embedded in the complex document) and hyperlink (each item is merely a link to another content) are referred to as an embedded image. Complex documents are not limited to HTML data, but are widely used as data for, for example, word processor software or spreadsheet software.

Visualization processing is a process executed in the apparatus to present users with a complex document. Complex documents contain data, such as tag-imparted text data in HTML, necessary to determine the visualization layout of the documents to be presented to the users. The data necessary to determine the layout will hereinafter be referred to as "main data." The data other than the main data will hereinafter be referred to as "sub-data." The main data may be any type of data, and be two or more types of data.

If a complete visualization layout of a complex document cannot be determined only from data for imparting a main layout (for example, if tag-imparted text data in HTML does not contain information indicating the numbers of rows and columns of pixels included in an embedded image), it may be necessary to execute visualization processing (in the above example, acquisition of the numbers of rows and columns of pixels) of part of embedded data (in the above example, the header information of the embedded image). In this case, such parts of data that are necessary to determine its visualization layout will be referred to as "main data." Namely, in the above example, the main layout (HTML) and the data up to the header information contained in the embedded images are regarded as main data, and the other information is regarded as sub-data.

The information inline-embedded in a tag-imparted text is treated as main data if it is necessary to determine the presentation layout, and treated as sub-data if it is not necessary. Although in the above example, an image in HTML is exemplified, other embedded objects designated by OBJECT, for example, can be also treated as sub-data. The data that are irrelevant to determining screen layout are also treated as sub-data.

In the embodiment, layout determination processing, presentation processing and visualization processing are defined as follows:

Layout determination processing is a process necessary to determine the layout of data to be rendered. For instance, in a Web browser in which a complex document written in HTML is downloaded from a server connected via a network, and is presented to a user, layout determination processing includes downloading an HTML file, storing it in a memory or disk, and determining a screen layout based on the acquired HTML file. If there is a related style sheet, download and analysis of the style sheet are included in layout determination processing.

Presentation processing is a process necessary to present data to a user regardless of the type of the data. For instance, if a presentation unit is a unit for reading a frame buffer connected to a PC and converting the read data into a display signal, the process of rendering data in the frame buffer is regarded as presentation processing. Rendering may be copying of image data stored in an offline memory, or rendering a text while converting it into graphic data based on font data.

Visualization processing includes all processes for presenting a complex document, other than layout determination processing and presentation processing. For instance, in the above-mentioned Web browser, downloading embedded image data and storing it in a memory or disk, and if the embedded image data are compressed, decompressing (decoding) it and storing it in a memory or disk are included in visualization processing. Further, rendering the data in a frame buffer, and converting, into a display signal, the data temporarily stored in the frame buffer are included in presentation processing.

When a file is downloaded from a server connected via a network during layout determination processing or visualization processing, it may be cached in local storage (such as a hard disk or memory), and be read the cached file when the same file should be downloaded again. In this case, the downloading step in the above-described procedure is replaced with reading of data from a cache.

It is not necessary to wait for execution of visualization processing or presentation processing until layout determination processing is completed. For instance, when the processing data are logs of a network board or a chat system, the entire layout may not be determined because such data are dynamically increased. In this case, it is sufficient if a temporary layout is determined based on acquired partial data, thereby performing visualization processing or presentation processing. More specifically, it is sufficient to update the layout incrementally whenever new data are received. In this case, it is also sufficient to process visualization processing and presentation processing incrementally based on the updated layout.

Which processes should be included in layout determination processing, visualization processing and presentation processing is determined in each embodiment. For example, when the apparatus which has hardware for copying compressed image data to a frame buffer and then presenting it while decoding it is used, the decoding process is included not in visualization processing, but in presentation processing.

Referring to FIG. 1, a description will be given of a scroll position estimation apparatus according to an embodiment.

The scroll position estimation apparatus of the embodiment comprises a complex document input unit 101, complex document storage unit 102, main data visualization unit 103, presentation layout memory 104, visualized-data memory 105, scroll position change input unit 106, current scroll position memory 107, scroll position history memory 108, sub-data visualization unit 109, visualization order determination unit 110, presentation unit 111, presentation layout computation unit 112, scroll position estimation unit 113 and estimated-scroll-position memory 114.

The complex document input unit 101 receives a complex document. The complex document storage unit 102 stores the complex document received by the complex document input unit 101.

Figures 2, 3:
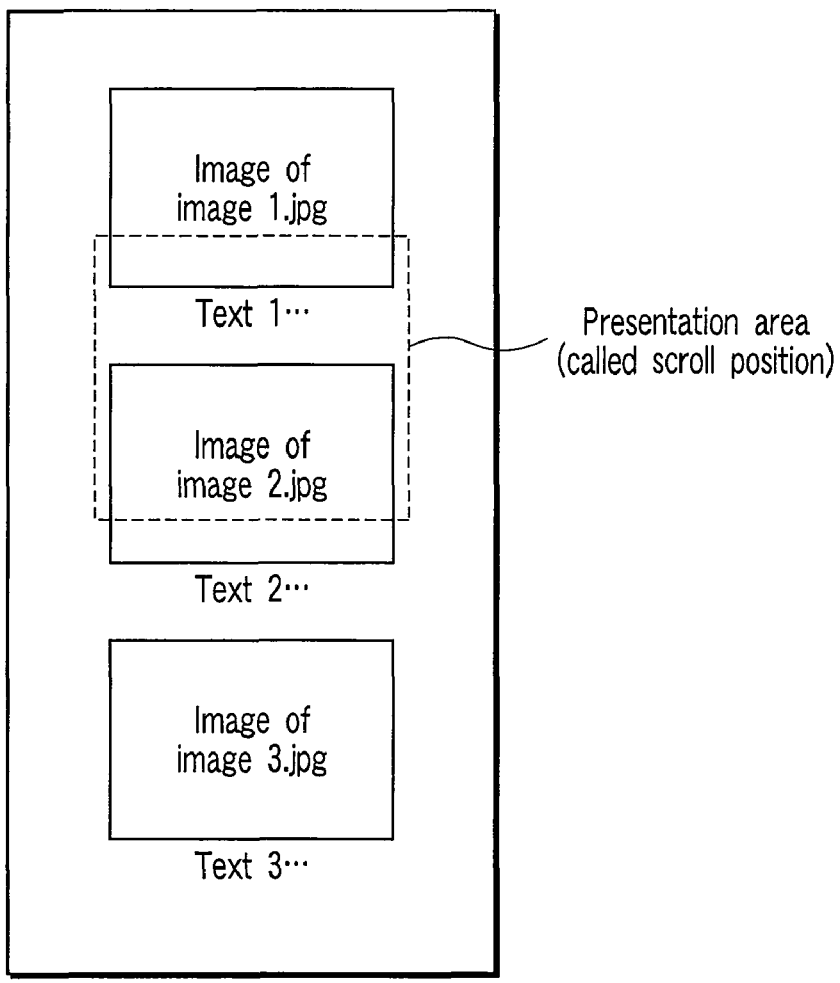
FIG. 2 is a view illustrating an example of main data.
FIG. 3 is a view useful in explaining a scroll position.

The presentation layout computation unit 112 extracts main data from the complex document stored in the complex document storage unit 102, and computes overall layout information for presentation. In HTML, the main data are, for example, tag-imparted texts as shown in FIG. 2. The presentation layout memory 104 stores the overall layout information computed by the presentation layout computation unit 112. Namely, the presentation layout memory 104 stores all data necessary for the overall presentation layout.

The scroll position change input unit 106 acquires information indicating a change in scroll position when the scroll position has been changed. The change information indicates, for example, the changed scroll position. The current scroll position memory 107 stores the current scroll position by acquiring the change information from the scroll position change input unit 106. The scroll position history memory 108 acquires the current scroll position from the current scroll position memory 107, and stores it as a history. Whenever change information is acquired, the scroll position history memory 108 stores, for example, the time at which the change information is acquired, and the scroll position at the time. The scroll position will be described later with reference to FIG. 3.

The scroll position estimation unit 113 estimates future scroll positions using the history of past scroll positions stored in the scroll position history memory 108. The estimated-scroll-position memory 114 stores the scroll position estimated by the scroll position estimation unit 113.

The visualization order determination unit 110 computes the priority level of visualization processing applied to each sub-data item, based on the overall layout information stored in the presentation layout memory 104, and the scroll position stored in the estimated-scroll-position memory 114. Further, the visualization order determination unit 110 determines the order of visualization of sub-data in accordance with the computed priority level. More particulars concerning the visualization order determination unit 110 will be described later, referring to FIG. 5.

The sub-data visualization unit 109 visualizes sub-data in the order determined by the visualization order determination unit 110. The main data visualization unit 103 acquires a complex document from the complex document storage unit 102, and visualizes the main data of the document.

The visualized-data memory 105 acquires visualized main data from the main data visualization unit 103, also acquires visualized sub-data from the sub-data visualization unit 109, and stores them.

The presentation unit 111 acquires visualized data from the visualized-data memory 105, also acquires the current scroll position from the current scroll position memory 107, and presents the acquired visualized data at the acquired scroll position.

Referring then to FIG. 3, the scroll position will be described.

The scroll position indicates a display area in a presented complex document (there may be a case where only main data are presented). When data are presented on, for example, a rectangular display or window, the scroll position can be expressed by "upper left coordinates," "width" and "height." In the case of FIG. 3, the upper left corner of the rectangle indicated by the broken line is the "upper left coordinates," the length of the horizontal line of the rectangle is the "width," and the length of the vertical line of the rectangle is the "height." Suppose here that the upper left corner of the screen is usually set as the origin of the coordinate. In the case of FIG. 3, the maximum frame indicated by a solid line corresponds to a screen, and the upper left corner of the frame corresponds to the origin.

When the size of the display or window is not changed, the scroll position can be expressed only by the upper left coordinates. The expression for the scroll position is not limited to the above-mentioned one. For instance, if the screen is rectangular, the upper left coordinates and lower right coordinates may be used to express the scroll position. Further, assume that the term "scroll position" used in the embodiment includes the meaning of "area," although the rectangular area is not a position but an area.

Referring then to FIG. 4, a description will be given of an operation example of the scroll position estimation apparatus of FIG. 1.

Firstly, the complex document input unit 101 acquires a complex document and stores it in the complex document storage unit 102. The presentation layout computation unit 112 acquires main data from the stored complex document, and computes overall (presentation) layout information from the main data (step S401). The computed overall layout information is stored in the presentation layout memory 104.

Subsequently, the scroll position change input unit 106 acquires change information indicating a change in scroll position, and the current scroll position memory 107 stores information indicating the current scroll position, based on the change information (step S402). Further, the scroll position history memory 108 accumulates the scroll position information.

The scroll position estimation unit 113 estimates a future scroll position, using the scroll position history output from the scroll position history memory 108, and the estimated-scroll-position memory 114 stores the estimated scroll position (step S403).

The visualization order determination unit 110 acquires the overall layout information and estimated scroll position from the presentation layout memory 104 and estimated-scroll-position memory 114, respectively, and computes the priority level of visualization processing applied to each sub-data item (step S404).

Based on the priority level computed at step S404, the visualization order determination unit 110 determines the order of visualization of each sub-data item (step S405).

The sub-data visualization unit 109 executes visualization processing on each sub-data item in the visualization order determined at step S405, and the main data visualization unit 103 executes visualization processing on main data (step S406). The visualized sub-data and main data are stored in the visualized-data memory 105.

The presentation unit 111 presents a user with the data stored in the visualized-data memory 105, referring to the current scroll position.

The above-mentioned steps S402 to S407 are iterated in units of preset periods. Alternatively, these steps may be iterated whenever a change in scroll position is detected.

A description will now be given of an example of visualization processing. In this case, visualization processing called "super resolution processing" is executed on sub-data as image data. In this example, assume that images embedded in a complex document and having a horizontal size of about 800 pixels is presented on a TV screen having a horizontal size of 1920 pixels, and that a tag-imparted text is main data, and the embedded images and objects are sub-data.

In this case, to present a user with data of a size set by a presenter, it is sufficient if a complex document to be presented on a TV screen is expanded to, for example, about 2.5 times. HTML scheme, for example, has a function, called a style sheet, of describing data for layout determination for each presentation apparatus, i.e., each media type. However, many HTML data items may contain no instruction of layout, or contain a style sheet for only one screen type. Further, many HTML data items are designed assuming that they are displayed on screens of about 800×1024 pixels.

A presentation layout using main data can be determined from text data, font size and the sizes of embedded images and objects. Without performing conversion to a raster bitmap or visualization of images, only a layout is determined from the size with which each tag-imparted text element and embedded images are presented. If the size of a text or image exceeds the horizontal size of the screen, arrangements such as word wrapping may be performed.

Visualization of text data can be realized by converting font data into a bitmap of the same font size as that used during presentation layout determination. Vector fonts such as True Type fonts or Type 1 fonts, which are often used as font data, are designed so that it can be converted into bitmap data of a desired size. However, the resolution of an embedded image is lower than that of a TV screen, and hence it is necessary to perform resolution conversion. To render an embedded image quickly, high-speed schemes such as nearest neighbor or bilinear processing can be employed for conversion of the resolution of an embedded image. In this case, however, the rendering quality of the image is inevitably reduced.

To enhance the rendering quality of images, still-image resolution conversion, called super resolution processing, which is disclosed in, for example, Japanese Patents Nos. 3369520, 3583924 and JP-A 2003-18398 (KOKAI), may be used. However, resolution conversion using super resolution processing requires much time. Accordingly, if super resolution processing is performed on each embedded image in the order of description in a complex document, images not to be presented as a result of scrolling may well become super resolution processing targets of high priority.

If the order of execution of super resolution processing on images is determined using a method employed in the embodiment, super resolution processing can be preferentially executed on images that are to be presented to a user for a long time. Even when visualization is not yet completed, if analysis of main data is completed, the size of sub-data on a display screen when it is visualized can be detected.

Accordingly, a frame or a text (place holder) according to the size may be presented, and it may be replaced with sub-data when visualization of the sub-data has been finished. Further, in the case of, for example, super resolution processing, in which high-speed substitution processing (e.g., nearest neighbor processing) can be utilized, visualization may be performed firstly using the high-speed substitution processing to thereby present the visualization result, then the sub-data contained in the visualization result be again subjected to visualization using super resolution processing, and the currently presented, visualized sub-data be replaced with the re-visualized sub-data. Furthermore, data currently being visualized may be presented before visualization is finished.

Figure 5:
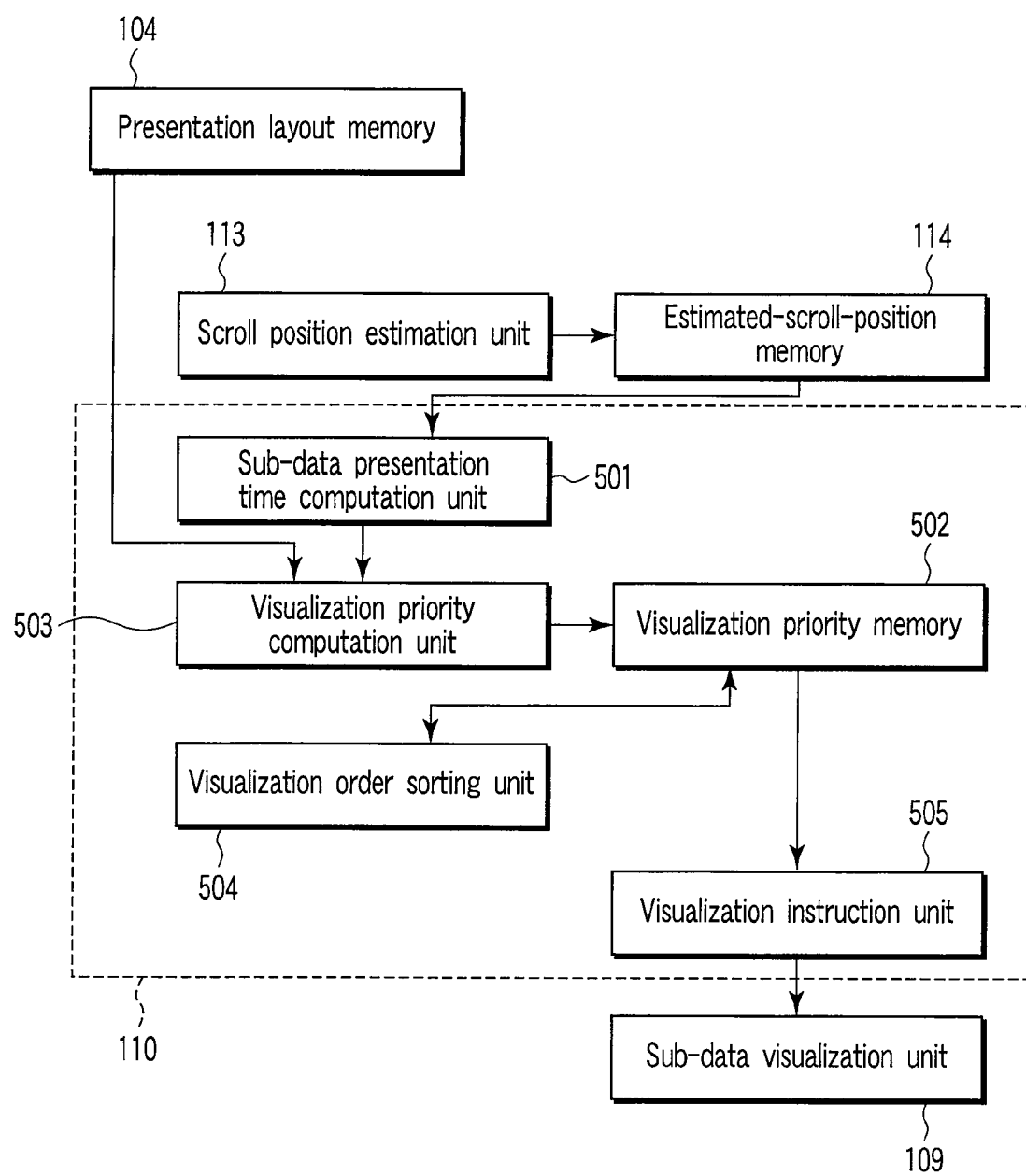
FIG. 5 is a block diagram illustrating the visualization order determination unit shown in FIG. 1.

Referring then to FIG. 5, a description will be given of an example of a method of computing the level of priority, using the visualization order determination unit 110. In the following description, elements similar to those described above are denoted by corresponding reference numbers, and no description is given thereof.

As shown in FIG. 5, the visualization order determination unit 110 comprises a sub-data presentation time computation unit 501, visualization priority memory 502, visualization priority computation unit 503, visualization order sorting unit 504 and visualization instruction unit 505.

The sub-data presentation time computation unit 501 computes the time of presenting each sub-data item, based on the estimated scroll position stored in the estimated-scroll-position memory 114.

The visualization priority computation unit 503 acquires the presentation time of each sub-data time from the sub-data presentation time computation unit 501, and determines the level of priority of each sub-data item so that the longer the presentation time, the higher the priority level. Further, the visualization priority computation unit 503 acquires overall-layout information from the presentation layout memory 104, and associates the overall layout with a pair of data items (each sub-data item and its priority level). The visualization priority memory 502 acquires the computed priority level of each sub-data item from the visualization priority computation unit 503, and stores the overall-layout information and the data pair (each sub-data item and its priority level).

The visualization order sorting unit 504 sequentially sorts, in the decreasing order of priority, the data pairs stored in the visualization priority memory 502, and reads therefrom the data pairs in the order of sorting.

The visualization instruction unit 505 instructs the sub-data visualization unit 109 to sequentially visualize the sub-data in the sorted data pairs, beginning with sub-data of the highest priority level.

Figure 6:
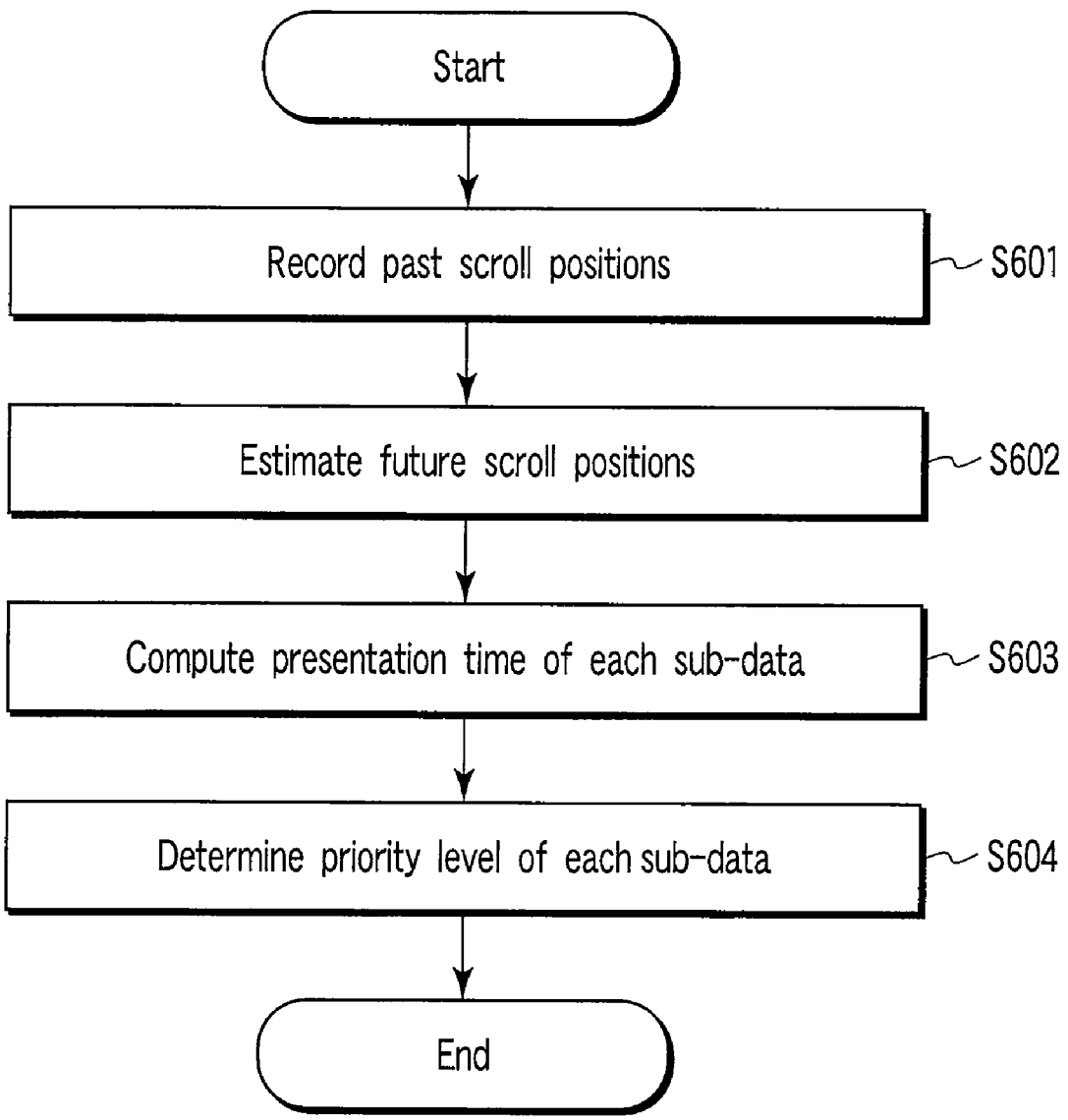
FIG. 6 is a flowchart useful in explaining an operation example of the visualization order determination unit of FIG. 5 for acquiring the priority degree of data.

Referring to FIG. 6, a description will be given of an operation example of computing the level of priority using a device including the visualization order determination unit shown in FIG. 5. FIG. 6 shows a procedure example for acquiring the level of priority after layout determination processing is finished and main data is presented.

Firstly, the scroll position history memory 108 accumulates past scroll positions (S601).

Based on the scroll positions accumulated in the scroll position history memory 108, the scroll position estimation unit 113 estimates future scroll positions, and the estimated-scroll-position memory 114 stores the estimated scroll positions (step S602).

Based on the estimated scroll positions stored in the estimated-scroll-position memory 114, the sub-data presentation time computation unit 501 computes the presentation time of each sub-data item (step S603).

The visualization priority computation unit 503 computes the priority level of each sub-data item, thereby acquiring a data pair (sub-data and priority level). The visualization priority memory 502 stores data pairs concerning all sub-data items (step S604). The visualization order sorting unit 504 sequentially sorts, in the decreasing order of priority, the data pairs stored in the visualization priority memory 502, thereby enabling the data pairs to be read in the order of sorting. The visualization order sorting unit 504 performs sorting so that the longer the presentation time, the higher the level of priority.

When, for example, the determined order of sorting is used for the method of determining the order of visualization of sub-data, it is sufficient if the visualization order sorting unit 504 sequentially sorts, in the decreasing order of priority, the data pairs stored in the visualization priority memory 502, and the visualization instruction unit 505 instructs the sub-data visualization unit 109 to sequentially visualize the sub-data in the sorted data pairs, beginning with sub-data of the highest priority level.

Storing past scroll positions (step S601) can be realized by periodically (e.g., in units of seconds) accumulating scroll positions.

The estimation of future scroll positions (step S602) is realized by, for example, extrapolation based on a polynomial function and utilizing n (n=2, 3, . . . ) post scroll positions. More specifically, future scroll position can be estimated by (1) acquiring the coefficient of a straight line from two (n=2) past scroll positions, by (2) acquiring a curve of the $(n-1)^{th}$ order based on n past scroll positions, or by (3) determining the least square solution of each of coefficients a and b included in y=at+b (t is the time, y is the scroll position. Namely, a future scroll position is estimated by acquiring a polynomial equation expressing the relationship between the time and scroll position, and inputting a future time thereto.

The presentation time of each sub-data item (step S603) can be computed by checking whether each sub-data are presented at each future discrete time, based on the presentation layout determined by layout determination processing, the positions estimated at future times, and the scroll position displayed, and by counting the number of future discrete times.

The level of priority of each sub-data item (step S504) may be set to, for example, the computed presentation time itself.

Figure 7:
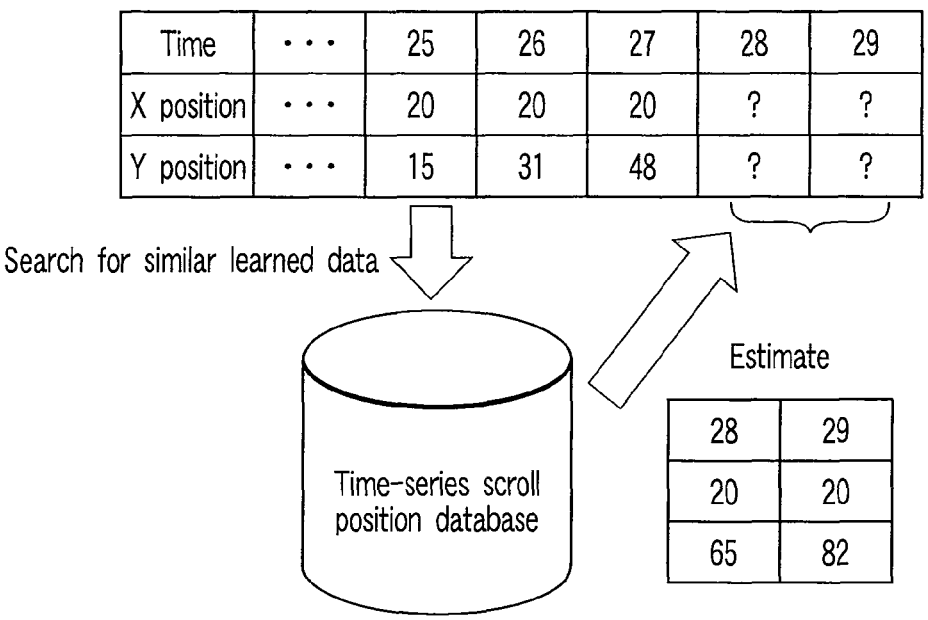
FIG. 7 is a view useful in explaining another method for estimating a scroll position.

Referring then to FIG. 7, another method example of estimating a future scroll position will be described.

A method of beforehand performing learning for estimating a scroll position, and then performing estimation based on the data obtained by learning, as shown in FIG. 7, can be utilized, in the priority computation method, as another method of estimating a future scroll position.

This method will now be described. For learning scroll position, a number of presentation devices (or presentation programs) for visualizing a target complex document in a conventional visualization order, and a number of complex documents for learning are prepared. In this case, a function of periodically acquiring scroll positions and recording the acquired scroll positions in relation to the acquisition times is beforehand imparted to each presentation device.

Learning is performed, for example, as follows:

Firstly, let at least one test subject (the number of subjects is not limited, but the greater the better) access a complex document via one of the devices. During access, the times and scroll positions are recorded. When a plurality of combinations of times and scroll positions have been obtained, the combination of n (n=1, 2, 3, . . . ) successive scroll positions (scroll position pattern history) and m (m=2, 3, . . . ) successive scroll positions (estimated scroll position pattern) are stored as learning data in a database. On storing scroll positions, each position is stored as a time relative to the position on the present time, instead of storing an absolute position.

In the estimation process using the learned database, firstly, n scroll positions are acquired as in the above-mentioned estimation process using the polynomial expression. After n scroll positions (which can be expressed in terms of vectors) are acquired, the vectors are converted into the values relative to the position on the present time, and the most similar scroll position pattern to the acquired scroll positions is searched for in the database. After searching, an estimated scroll position pattern related to the searched scroll position pattern is set as an estimated position pattern. In the estimation process after the learning process, only upper left points may be detected, even when upper left points, widths and heights are parameters for determining scroll positions.

Further, if the acquired vectors significantly differ from those in the scroll position pattern stored in the database (i.e., if the absolute value of the difference between each acquired vector and the corresponding value in the scroll position pattern history is not less than a threshold value), the future scroll positions don't have to be estimated from the learning data, and the above-mentioned linear estimation or estimation using polynomial equation may be employed instead. When, for example, the scroll position is two-dimensionally expressed utilizing horizontal and vertical axes, the values to be recorded in the database may be regarded as two-dimensional data, or as one-dimensional data. In the latter case, the horizontal and vertical positions are supposed to be independent of each other. When treating the scroll position as one-dimensional data, both horizontal and vertical position data may be stored in a single database, supposing that the horizontal and vertical positions have the same statistical characteristic. Alternatively, different databases may be prepared for horizontal and vertical position data.

Where a plurality of types of sub-data items exist and are distinguishable, it is effective to prepare different levels of priority for different types. For instance, assume that super resolution processing is performed for visualization on a complex document written in HTML and including an image file that is called GIF and expressed by 256 colors or less, and an image file that is called JPEG and expressed by full colors. Assume here that it is beforehand understood as knowledge that users wish to visualize, using super resolution processing, a greater number of JPEG image files than GIF image files. If no consideration is given to the type of sub-data, the level of priority output by the above-mentioned method is directly used, and hence a higher level of priority is imparted to image data of a longer presentation time, regardless of whether the image data are JPEG image or GIF image.

In contrast, if constants indicating levels of importance of sub-data are preset for the respective types of sub-data, and the output priority level is multiplied by or added to the corresponding sub-data importance level, the priority level of, for example, a JPEG image can be increased. Alternatively, supposing that the level of importance of sub-data is x, and the level of priority of output is y, different functions in the form of y=f(x) with coefficients may be preset for different types of sub-data, so that the priority level of each sub-data can be modified using the corresponding function.

In the above-described complex document, each sub-data item is a still image. However, even when each sub-data contains, for example, still and moving images, and visualization processing and presentation processing are greatly changed, control of priority level is effective. A description will be given of, for example, a case where a complex document contains a still image and a moving image described later. In still image visualization processing, file input (reading of a file from a disk, or downloading of a file from a server via a network), analysis of the input file (if the input file is a compressed still image, it is decoded), and conversion of the file data into bitmap data are performed. When sub-data are a still image, it does not change and hence can be converted into bitmap data using high quality processing such as super resolution processing.

On the other hand, when dynamic content, such as moving images or scripts, is sub-data to be visualized, it changes with time, and hence visualization processing may be limited to the input of a file and analysis of header information of the file, whereas decoding of compressed images and execution of the scripts may be included in presentation processing. In this case, since presentation processing of dynamic content always requires a certain computation time, the computation time that can be used for visualization processing of other sub-data is reduced. In this case, if no sub-data importance level is used, the computation time that can be assigned to visualization processing of still images is much reduced, much time may be required for their visualization. To avoid this, sub-data importance levels are set so that still images will have a higher priority level and hence be visualized earlier than dynamic content.

Further, in some cases of visualization processing, the tradeoff of the speed and quality of visualization processing can be controlled by setting parameters. For instance, assume that a complex document containing compressed image data obtained by transforming sub-data by discrete cosine transform (DCT) or wavelet transform and then compressing the resultant data is stored as a file, and that visualization processing is the decompression (decoding) of the compressed image data. This state often occurs when, for example, the complex document is data for word processor software. In this case, if the speed is important, the speed can be enhanced while degrading the quality, unless the high-frequency component of the compressed image data is decoded.

Further, in super resolution processing disclosed in, for example, JP-A 2003-18398 (KOKAI), there is a step of retrieving data from a trading database in units of small areas. In this case, if not all candidates but only a preset number of candidates set as parameters are retrieved from the database, the speed can be increased with the quality degraded. When a tradeoff relationship exists between speed and quality in visualization processing, a parameter may be set to enhance the quality of visualization of sub-data of a high priority level, assuming that the higher the priority level of sub-data, the more important the quality of visualization of the sub-data.

In the above-described embodiment, a method of setting the order of visualization has been described. When a multitask OS corresponding to a thread is used as base software, and the main portion of the time required for visualization is a computation time, as in super resolution processing, the order of visualization processing can be changed by assigning threads to respective sub-data items, and setting the computation time so that the higher the priority level of sub-data, the greater the computation time of visualizing the sub-data.

The method of changing the scroll position depends upon the input device. If a mouse or tablet connected to a personal computer is used as the input device, the presentation device may be designed to display a scroll bar and provide a user interface for dragging (moving) the scroll bar using a button or pen. If upper/lower, right/left buttons provided on a cellular phone, keyboard, TV remote controller are used as input device components, the amount of movement of the scroll position assumed when each button is operated may be preset so that the scroll position is moved by the present amount whenever each button is operated. Further, if both the scroll position and focused position are moved as in the case where an instruction to move the link position is issued, the focused position may be moved when each button is pressed, and the scroll position is also moved when the focused position falls outside the presentation area.

By performing the ordering of priority levels using the above-described method, important data to be selected by scrolling can be preferentially visualized, and the time required for presenting the important data to a user can be shortened.

Figure 8:
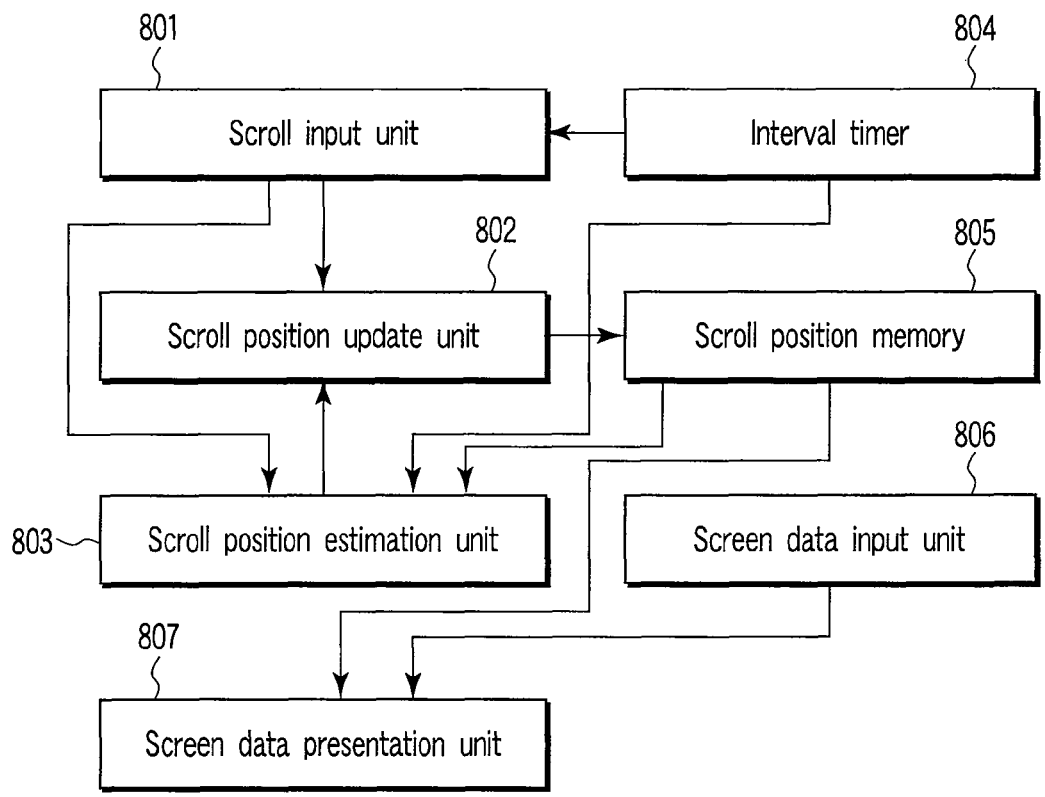
FIG. 8 is a block diagram illustrating a scroll position estimation apparatus for providing automatic scrolling.
Figure 9:
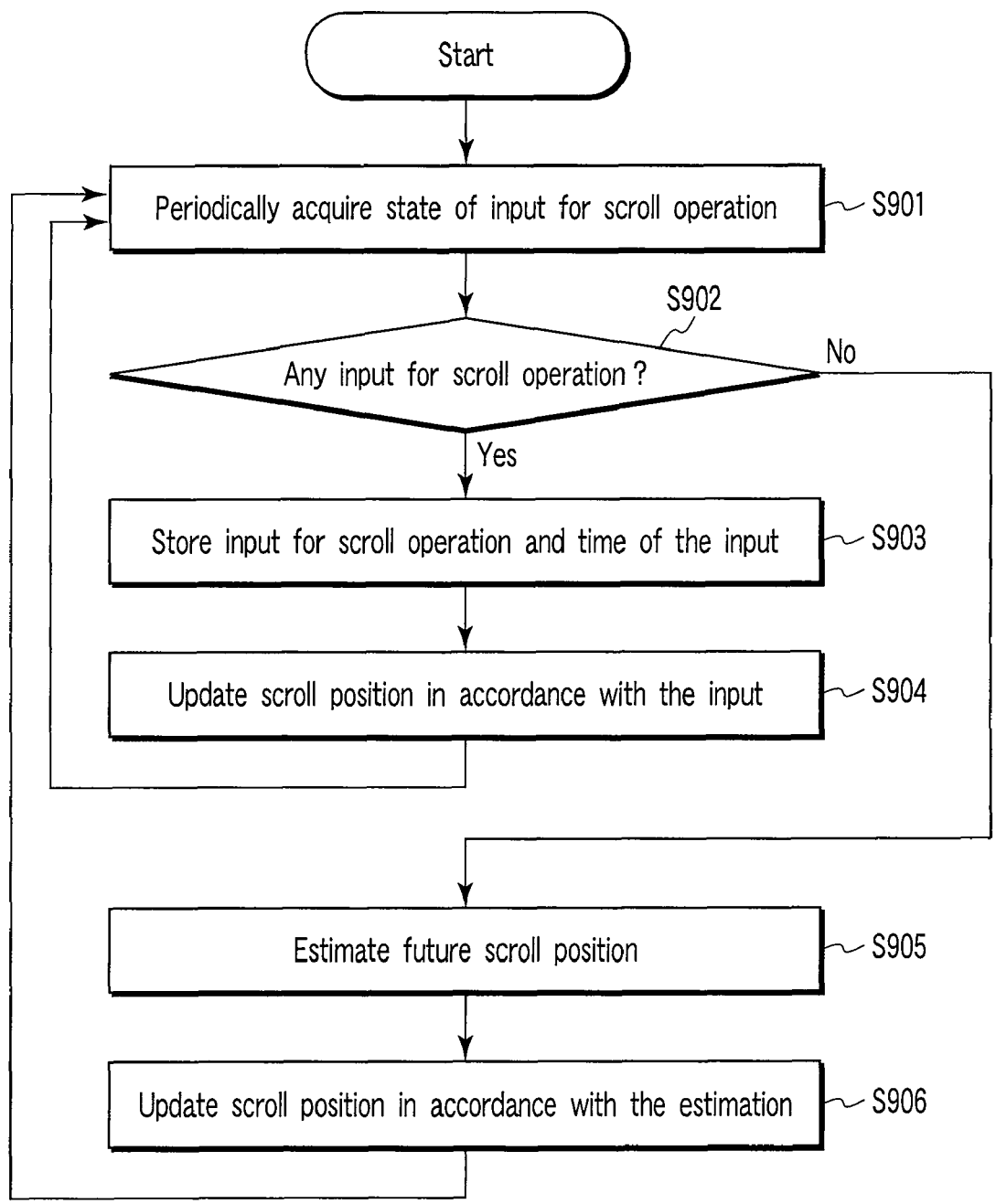
FIG. 9 is a flowchart illustrating an operation example of the scroll position estimation apparatus of FIG. 8.

Referring now to FIGS. 8 and 9, a description will be given of a method of providing a user with an automatic scroll function realized by the scroll position estimation device of the embodiment. FIG. 8 is a block diagram illustrating a scroll position estimation apparatus as an application example. FIG. 9 is a flowchart illustrating an operation example of the scroll position estimation apparatus of FIG. 8 for providing the automatic scroll function.

The embodiment can provide, for example, i) an automatic scroll function of automatically performing scrolling when a user has pressed a preset button several times, and ii) a function of enabling the user to again perform a button operation when inconvenient scrolling has been executed by automatic scrolling.

The scroll position estimation apparatus employed in the above embodiment comprises a scroll input unit 801, scroll position update unit 802, scroll position estimation unit 803, interval timer 804, scroll position memory 805, screen data input unit 806 and screen data presentation unit 807.

The scroll input unit 801 acquires operation information when an operation for scrolling has been executed. For instance, when a button for scroll operation has been pressed, the scroll input unit 801 acquires information indicating that the button is being pressed.

The scroll position update unit 802 acquires a changed scroll position when the scroll input unit 801 has been operated. The scroll position memory 805 stores the scroll position acquired by the scroll position update unit 802. The scroll position update unit 802 updates the scroll position stored in the scroll position memory 805, in accordance with an instruction, described later, sent from the scroll position estimation unit 803. At this time, the scroll position memory 805 holds a preset number of past scroll positions. The preset number corresponds to the number of scroll positions necessary for estimation by the scroll position estimation unit 803.

The interval timer 804 periodically drives the scroll input unit 801. The scroll input unit 801, in turn, acquires scroll positions at the intervals determined by the interval timer 804. However, the input state may not always be acquired periodically. For instance, the input state may be acquired when hardware or software has received an input.

The scroll position estimation unit 803 periodically acquires information indicating whether the scroll input unit 801 has acquired a scroll position. If a scroll position is acquired, the scroll position estimation unit 803 acquires the scroll position and the time at which scrolling is executed. In contrast, if no scroll position is acquired, the scroll position estimation unit 803 estimates a future scroll position using, for example, the method at step S602, based on the scroll position history stored in the scroll position memory 805. If a scroll position is acquired, the scroll position estimation unit 803 instructs the scroll position update unit 802 to update the latest scroll position to the acquired one. If no scroll position is acquired, the scroll position estimation unit 803 instructs the scroll position update unit 802 to update the latest scroll position to the estimated one.

The screen data input unit 806 acquires screen data from, for example, a screen data source. The screen data presentation unit 807 receives the screen data from the screen data input unit 806, and acquires the present scroll position from the scroll position memory 805, thereby presenting the screen data at the scroll position.

Referring to FIG. 9, a description will be given of an operation example of the scroll position estimation apparatus of FIG. 8.

The input state of scroll operations is periodically acquired (step S901). For instance, the interval timer 804 periodically drives the scroll input unit 801, and the scroll input unit 801 acquires information indicating whether a preset button is pressed, whenever the scroll input unit 801 is driven. However, it is not always necessary for the scroll input unit 801 to acquire the input state periodically. The input state may be acquired when hardware or software has received an input.

The scroll position estimation unit 803 periodically checks whether there is an input for a scroll operation (hereinafter referred to as a "scroll operation input") (step S902). To this end, the scroll position estimation unit 803 may be periodically driven using the interval timer 804. If there is a scroll operation input, the program proceeds to step S903, whereas if there is no such input, the program proceeds to step S905.

The scroll position estimation unit 803 stores the input scroll operation, and the time at which the scroll operation has been performed (step S903).

In accordance with the input, the scroll position estimation unit 803 sends an instruction to update the scroll position to the scroll position update unit 802 (step S904). In accordance with the instruction from the scroll position estimation unit 803, the scroll position update unit 802 updates the scroll position stored in the scroll position memory 805. At this time, the scroll position memory 805 holds a preset number of past scroll positions. The preset number corresponds to the number of scroll positions necessary for estimation by the scroll position estimation unit 803. After the update process, the program returns to step S901.

The scroll position estimation unit 803 estimates a future scroll position using the stored scroll position history (step S905).

The scroll position estimation unit 803 supplies the scroll position update unit 802 with an instruction to update the scroll position to the estimated one, whereby the scroll position update unit 802 replaces the data of the scroll position memory 805 with the estimated scroll position by a method similar to step S904 (step S906).

Instead of always sending an instruction to update the scroll position to an estimated one at step S906 when there is no input for a scroll operation, automatic scrolling may be executed only when a user has pressed the preset button several times, by controlling the scroll position update instruction as follows:

A memory for holding the number of scroll operation inputs continuously made, and a memory for holding the time for which no scroll operation inputs are made, which are not shown, are beforehand prepared. These memories are initialized to a preset value (e.g., 0). If a scroll operation input has been received at step S903, the number of continuous scroll operation inputs is incremented by 1, and the time for which no scroll operation inputs are made is set 0. However, if the time exceeds a preset threshold value, the number of continuous scroll operation inputs is incremented by 1 after it is once reset, and the time is reset to 0. At step S906, unless the number of continuous scroll operation inputs exceeds a preset threshold value, no update process is executed, and the program is returned to step S901. It can be expected that the automatic scroll operation will be executed only when a user wishes, if the operation of pressing the preset button several times is used as a trigger. Further, the value added to the number of continuous scroll operation inputs is not limited to 1.

The above-mentioned automatic scroll operation enables the number of scroll operations made by a user to be reduced, and hence enables a convenient user interface to be provided.

In the above-described embodiment, the method of determining the sub-data, to be preferentially visualized, in accordance with the state of scrolling enables the sub-data, to be presented to a user for a long time, to be preferentially visualized, and enables a delay in presentation to be reduced. Further, automatic scrolling enables the number of scroll operations made by a user to be minimized, thereby realizing a convenient user interface.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A scroll position estimation apparatus comprising:
a first acquisition unit configured to acquire a complex document including main data and a plurality of sub-data items, the main data being for determining a layout of presentation of the complex document;
a first visualization unit configured to visualize the main data;
a first presentation unit configured to present the visualized main data;
a second acquisition unit configured to acquire a plurality of scroll positions indicating display areas of the presented main data;
a position-time storage unit configured to store pairs of the scroll positions and a plurality of times of acquiring the scroll positions;
a first estimation unit configured to estimate a future scroll position based on the scroll positions and the times;
a priority computation unit configured to compute a plurality of priority levels of the sub-data items based on the estimated scroll position, the priority levels being used to determine order of visualization;
a second visualization unit configured to sequentially visualize the sub-data items in accordance with the computed priority levels of the sub-data items; and
a second presentation unit configured to present the visualized sub-data items.

2. The apparatus according to claim 1, wherein: the first estimation unit includes: a coefficient computation unit configured to compute, using the scroll positions and the times, a plurality of coefficients of a polynomial function describing a relationship between the scroll positions and the times; and
a second estimation unit configured to estimate the future scroll position using the polynomial function with the computed coefficients, and
the priority computation unit includes: a computation unit configured to compute, based on the estimated scroll position, a presentation time for which each sub-data item is presented; and
a setting unit configured to set the priority level of each sub-data item, the priority level increasing as the presentation time increases.

3. The apparatus according to claim 1, further comprising a scroll position storage unit configured to store a plurality of learned scroll positions learned by user operations and a plurality of learning times, the learned scroll positions being acquired at the learning times, and wherein:

the second acquisition unit periodically acquires the scroll positions;

the first estimation unit includes: a search unit configured to search for a learned pattern most similar to a pattern acquired by the second acquisition unit, the learned pattern including the learned scroll positions and learning times, the pattern including the scroll positions and the times; and a second estimation unit configured to estimate the future scroll position using the searched learned pattern; and the priority computation unit includes: a computation unit configured to compute, based on the estimated scroll position, a presentation time for which each sub-data item is presented; and a setting unit configured to set the priority level of each sub-data item.

4. The apparatus according to claim 1, wherein the first acquisition unit acquires image data as each of the sub-data items, and the second visualization unit visualizes the image data after setting a first resolution degree of the image data equal to a second resolution degree presented by the second presentation unit, when the first resolution degree is unequal to the second resolution degree.

5. The apparatus according to claim 1, wherein the first acquisition unit acquires two or more types of the sub-data items, and the priority computation unit computes the priority level of each of the sub-data items, using a corresponding one of functions determined for the respective types.

6. A scroll position estimation apparatus comprising:

a first change unit configured to change a scroll position indicating a display area in a document;

a detection unit configured to detect whether the scroll position is changed;

a storage unit configured to store a scroll operation performed to change the scroll position, and a time at which the scroll operation is performed, when it is detected that the scroll position is changed;

a second change unit configured to change the scroll position in accordance with the scroll operation;

an estimation unit configured to estimate a future scroll position based on the stored scroll operation and the stored time, when it is detected that the scroll position is not changed; and a third change unit configured to change the scroll position to the estimated scroll position.

7. A scroll position estimation apparatus comprising:

a first change unit configured to change a scroll position indicating a display area in a document;

a detection unit configured to detect whether the scroll position is changed;

a first storage unit configured to store a scroll operation performed to change the scroll position, and a time at which the scroll operation is performed, when it is detected that the scroll position is changed;

a second storage unit configured to store number of occasions in which the scroll operation is performed;

an increasing unit configured to increase the stored number whenever the scroll operation is performed;

an initialization unit configured to initialize the stored number when a time elapsing after the scroll operation is performed lastly exceeds a first threshold value;

a second change unit configured to change the scroll position in accordance with the scroll operation;

an estimation unit configured to estimate a future scroll position based on the stored scroll operation and the stored time, when it is detected that the scroll position is not changed, and when the stored number exceeds a second threshold value; and a third change unit configured to change the scroll position to the estimated scroll position.

8. A scroll position estimation method comprising:

acquiring a complex document including main data and a plurality of sub-data items, the main data being for determining a layout of presentation of the complex document;

visualizing the main data;

presenting the visualized main data;

acquiring a plurality of scroll positions indicating display areas of the presented main data;

preparing a storage unit configured to store pairs of the scroll positions and a plurality of times of acquiring the scroll positions;

estimating a future scroll position based on the scroll positions and the times;

computing a plurality of priority levels of the sub-data items based on the estimated scroll position, the priority levels being used to determine order of visualization;

sequentially visualizing the sub-data items in accordance with the computed priority levels of the sub-data items; and presenting the visualized sub-data items.

9. The method according to claim 8, wherein estimating the future scroll position includes: computing, using the scroll positions and the times, a plurality of coefficients of a polynomial function describing a relationship between the scroll positions and the times; and estimating the future scroll position using the polynomial function with the computed coefficients, and computing the priority levels includes: computing, based on the estimated scroll position, a presentation time for which each sub-data item is presented; and setting the priority level of each sub-data item, the priority level increasing as the presentation time increases.

10. The method according to claim 8, further comprising preparing a storage unit configured to store a plurality of learned scroll positions learned by user operations and a plurality of learning times, the learned scroll positions being acquired at the learning times, and wherein:

acquiring the scroll positions includes acquiring the scroll positions;

estimating the future scroll position includes: searching for a learned pattern most similar to a pattern, the learned pattern including the learned scroll positions and learning times, the pattern including the scroll positions and the times; and estimating the future scroll position using the searched learned pattern; and the computing the priority levels includes: computing, based on the estimated scroll positions, a presentation time for which each sub-data item is presented; and setting the priority level of each sub-data item.

11. The method according to claim 8, wherein: acquiring the complex document includes acquiring image data as each of the sub-data items; and sequentially visualizing the sub-data items includes visualizing the image data after setting a first resolution degree of the image data equal to a second resolution degree when the visualized sub-data items are presented, when the first resolution degree is unequal to the second resolution degree.

12. The method according to claim 8, wherein visualizing the main data includes acquiring two or more types of the sub-data items, and computing the priority levels includes computing the priority level of each of the sub-data items, using a corresponding one of functions determined for the respective types.

* * * * *